United States Patent [19]
Bruce et al.

[11] Patent Number: 6,000,006
[45] Date of Patent: Dec. 7, 1999

[54] UNIFIED RE-MAP AND CACHE-INDEX TABLE WITH DUAL WRITE-COUNTERS FOR WEAR-LEVELING OF NON-VOLATILE FLASH RAM MASS STORAGE

[75] Inventors: Ricardo H. Bruce, Union City; Rolando H. Bruce, South San Francisco; Earl T. Cohen; Allan J. Christie, both of Fremont, all of Calif.

[73] Assignee: BIT Microsystems, Inc., Fremont, Calif.

[21] Appl. No.: 08/918,203

[22] Filed: Aug. 25, 1997

[51] Int. Cl.[6] ............................................. G06F 12/10
[52] U.S. Cl. ............................. 711/103; 711/206
[58] Field of Search ................................. 711/103, 206; 712/37; 365/230.03, 185.33, 218

[56] References Cited

U.S. PATENT DOCUMENTS

| | | | |
|---|---|---|---|
| 5,222,046 | 6/1993 | Kreifels et al. | 365/230.06 |
| 5,297,148 | 3/1994 | Harari et al. | 371/10.2 |
| 5,341,339 | 8/1994 | Wells | 365/218 |
| 5,371,709 | 12/1994 | Fisher et al. | 365/226 |
| 5,379,401 | 1/1995 | Robinson et al. | 395/425 |
| 5,388,083 | 2/1995 | Assar et al. | 365/218 |
| 5,396,468 | 3/1995 | Harari et al. | 365/218 |
| 5,406,529 | 4/1995 | Asano | 365/230.03 |
| 5,432,748 | 7/1995 | Hsu et al. | 365/230.01 |
| 5,448,577 | 9/1995 | Wells et al. | 371/10.1 |
| 5,459,850 | 10/1995 | Clay et al. | 395/497.02 |
| 5,479,638 | 12/1995 | Assar et al. | 395/430 |
| 5,485,595 | 1/1996 | Assar et al. | 395/430 |
| 5,488,711 | 1/1996 | Hewitt et al. | 395/430 |
| 5,500,826 | 3/1996 | Hsu et al. | 365/230.01 |
| 5,509,134 | 4/1996 | Fandrich et al. | 395/430 |
| 5,513,138 | 4/1996 | Manabe et al. | 365/185.33 |
| 5,524,231 | 6/1996 | Brown | 395/428 |
| 5,530,828 | 6/1996 | Kaki et al. | 395/430 |
| 5,535,328 | 7/1996 | Harari et al. | 395/182.05 |
| 5,535,356 | 7/1996 | Kim et al. | 395/430 |
| 5,542,082 | 7/1996 | Solhjell | 395/442 |
| 5,548,741 | 8/1996 | Watanabe | 395/442 |
| 5,559,956 | 9/1996 | Sukegawa | 395/182.06 |
| 5,568,423 | 10/1996 | Jou et al. | 365/185.33 |
| 5,568,439 | 10/1996 | Harari | 365/218 |
| 5,572,466 | 11/1996 | Sukegawa | 365/185.33 |
| 5,594,883 | 1/1997 | Pricer | 395/440 |
| 5,602,987 | 2/1997 | Harari et al. | 395/182.06 |
| 5,603,001 | 2/1997 | Sukegawa et al. | 395/430 |
| 5,606,529 | 2/1997 | Honma et al. | 365/230.03 |
| 5,606,532 | 2/1997 | Lambrache et al. | 365/238.5 |
| 5,619,470 | 4/1997 | Fukumoto | 365/228 |
| 5,627,783 | 5/1997 | Miyauchi | 365/185.33 |
| 5,640,349 | 6/1997 | Kakinuma et al. | 365/185.33 |
| 5,737,742 | 4/1998 | Achiwa et al. | 711/103 |
| 5,802,554 | 9/1998 | Cáceres et al. | 711/103 |
| 5,819,307 | 10/1998 | Iwamoto et al. | 711/103 |

*Primary Examiner*—Eddie P. Chan
*Assistant Examiner*—Gary J. Portka
*Attorney, Agent, or Firm*—Stuart T. Auvinen

[57] ABSTRACT

A flash-memory system provides solid-state mass storage as a replacement to a hard disk. A unified re-map table in a RAM is used to arbitrarily re-map all logical addresses from a host system to physical addresses of flash-memory devices. Each entry in the unified re-map table contains a physical block address (PBA) of the flash memory allocated to the logical address, and a cache valid bit and a cache index. When the cache valid bit is set, the data is read or written to a line in the cache pointed to by the cache index. A separate cache tag RAM is not needed. When the cache valid bit is cleared, the data is read from the flash memory block pointed to by the PBA. Two write count values are stored with the PBA in the table entry. A total-write count indicates a total number of writes to the flash block since manufacture. An incremental-write count indicates the number of writes since the last wear-leveling operation that moved the block. Wear-leveling is performed on a block being written when both total and incremental counts exceed system-wide total and incremental thresholds. The incremental-write count is cleared after a block is wear-leveled, but the total-write count is never cleared. The incremental-write count prevents moving a block again immediately after wear-leveling. The thresholds are adjusted as the system ages to provide even wear.

19 Claims, 7 Drawing Sheets

| LBA | PBA | TOT_WR'S | INCR_WR'S |
|-----|-----|----------|-----------|
| 001 | 001 | 50,000   | 50,000    |
| 010 | 101 | 20,000   | 20,000    |
| 011 | 111 | 250,001  | 250,001   |
| 100 | 011 | 350,000  | 15,000    |
| 101 | 100 | 125,000  | 125,000   |
| 110 | 000 | 200,000  | 200,000   |
| 111 | 010 | 300,000  | 12,000    |

TOT_THRESH = 250,000
INCR_THRESH = 25,000

FIG. 7A

| LBA | PBA | TOT_WR'S | INCR_WR'S |
|-----|-----|----------|-----------|
| 001 | 001 | 50,000   | 50,000    |
| 010 | 111 | 250,002  | 1         |
| 011 | 101 | 20,001   | 1         |
| 100 | 011 | 350,000  | 15,000    |
| 101 | 100 | 125,000  | 125,000   |
| 110 | 000 | 200,000  | 200,000   |
| 111 | 010 | 313,001  | 25,001    |

TOT_THRESH = 250,000
INCR_THRESH = 25,000

FIG. 7B

| LBA | PBA | TOT_WR'S | INCR_WR'S |
|---|---|---|---|
| 001 | 010 | 313,002 | 1 |
| 010 | 111 | 255,001 | 5,000 |
| 011 | 101 | 22,000 | 2,000 |
| 100 | 011 | 350,000 | 15,000 |
| 101 | 100 | 125,000 | 125,000 |
| 110 | 000 | 200,000 | 200,000 |
| 111 | 001 | 50,001 | 1 |

TOT_THRESH = 250,000
INCR_THRESH = 25,000

FIG. 7C

| LBA | PBA | TOT_WR'S | INCR_WR'S |
|---|---|---|---|
| 001 | 010 | 313,002 | 1 |
| 010 | 111 | 275,002 | 25,001 |
| 011 | 101 | 22,000 | 2,000 |
| 100 | 011 | 350,000 | 15,000 |
| 101 | 100 | 125,000 | 125,000 |
| 110 | 000 | 200,000 | 200,000 |
| 111 | 001 | 250,001 | 200,001 |

96

98

TOT_THRESH = 250,000
INCR_THRESH = 25,000

FIG. 7D

| LBA | PBA | TOT_WR'S | INCR_WR'S |
|-----|-----|----------|-----------|
| 001 | 010 | 313,002  | 1         |
| 010 | 101 | 250,001  | 228,001   |
| 011 | 111 | 275,003  | 1         |
| 100 | 011 | 350,000  | 15,000    |
| 101 | 001 | 254,001  | 4,000     |
| 110 | 000 | 250,000  | 250,000   |
| 111 | 100 | 125,000  | 125,000   |

TOT_THRESH = 300,000
INCR_THRESH = 25,000

UNIFIED RE-MAP AND CACHE-INDEX TABLE WITH DUAL WRITE-COUNTERS FOR WEAR-LEVELING OF NON-VOLATILE FLASH RAM MASS STORAGE

BACKGROUND OF THE INVENTION

1. Field of the Invention

This invention relates to non-volatile memory storage systems, and more particularly to wear-leveling, caching, and re-mapping of flash memory.

2. Description of the Related Art

Non-volatile semiconductor memory is useful for relatively long-term storage in computer systems. Often the computer's hard disk is replaced by an array of non-volatile random-access memories (NVRAM's) or non-volatile flash memories. Battery-backed DRAM is sometimes used. These memory devices use electrically-erasable programmable read-only-memory (EEPROM) technology for storage cells. Floating polysilicon gates in these storage cells retain charge and state when power is lost, providing non-volatile storage.

Flash EEPROM chips are divided into pages and blocks. A 64 Mbit flash chip typically has 512-byte pages which happens to match the sector size for IDE and SCSI hard disks. Rather than writing to just one word in the page, the entire page must be written at the same time; individual bytes cannot be written. The page must be cleared of any previous data before being written; clearing is accomplished by a flash erase cycle. An entire block pages (typically 16 pages) is erased at once. Thus a block of 16 pages must be erased together, while all 512 bytes on a page must be written together. EEPROM memory cells are not as reliable as static or dynamic RAM cells. Indeed, one or two percent of the pages on a new flash chip are usually defective when sold to the customer. EEPROM cells wear out as they are written and erased because some charge is trapped in the insulating oxide layers surrounding the floating gate. Eventually this trapped charge increases until it prevents an applied voltage from sufficiently reading the cell. Thus a scheme is needed to identify such defective memory cells and replace them with good cells.

Figure 1:
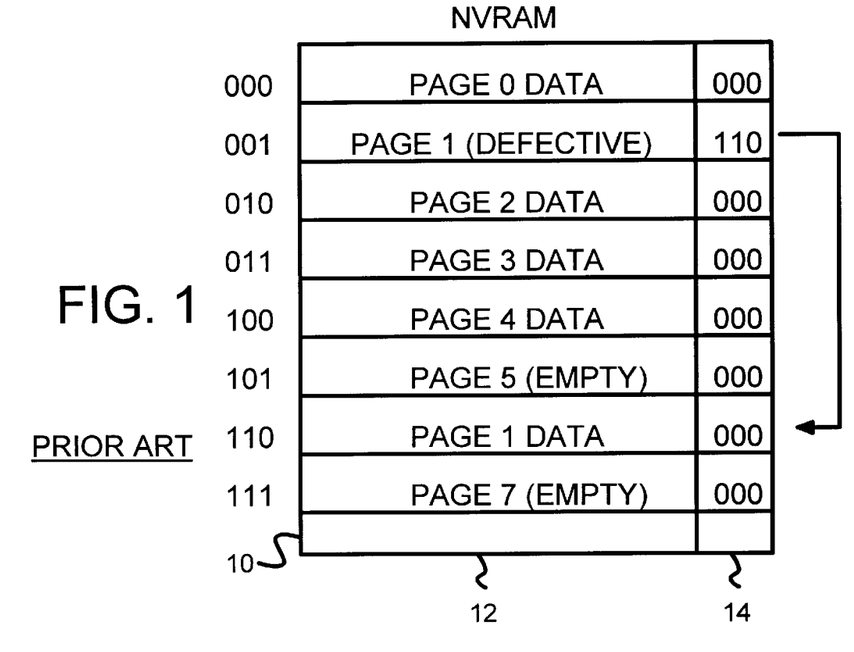
FIG. 1 is a prior-art replacement scheme for re-mapping defective pages of flash memory.

FIG. 1 is a prior-art replacement scheme for re-mapping defective pages of flash memory. Flash chip 10 has a memory array of EEPROM cells arranged into pages. Each page contains a 512-byte data field 12, and an additional 16-byte pointer field 14. Pointer field 14 contains a re-map bit (not shown) that is set when a defect is found in any of the 512 bytes of data in the page. When a page is read, the re-map bit is also read to determine if the page is defective. If defective, a pointer to another page is read from pointer field 14. The new page pointed to contains the replaced data.

For example, page 1 of FIG. 1 is defective. When page 1 at address 001 is read and found to be defective, pointer field 14 is also read. Pointer field 14 for page 1 contains the pointer 110. The address is changed to 110 so that the replacement page at address 110 is read to obtain the data for page 1. Thus address 001 to page 1 is re-mapped by pointer field 14 to replacement page 6 at address 110. Page 6 was initially reserved as a spare page for later replacement of a defective page.

An extra read of the flash memory may be necessary to read the bad data with the pointer. Another problem with using pointer field 14 for re-mapping is that the 16 bytes of the pointer field must be good. When a defect occurs in the data field 12 of a page, and in pointer field 14, then the defective page cannot be re-mapped and bad data can be read. It is thus critical that the pointer field 14 contain good memory cells.

Figure 2:
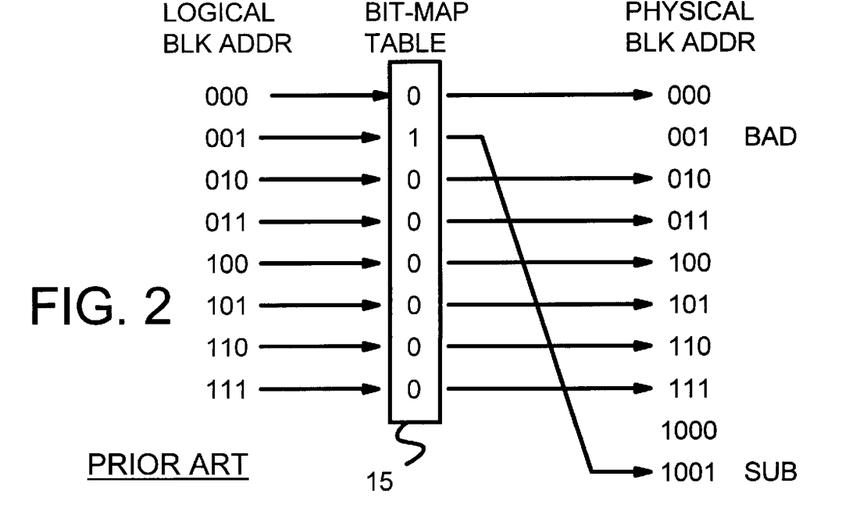
FIG. 2 shows a prior-art re-mapping scheme using a bit-map table.

FIG. 2 shows a prior-art re-mapping scheme using a bit-map table. To work around the problems of using the pointer fields in the flash memory pages, a separate re-map table in SRAM is used. SRAM re-map table 15 is accessed when the flash memory chip is accessed. Most logical addresses are simply passed through without translation or re-mapping since the corresponding bit in re-map table 15 is a zero. However, when a logical address's entry in re-map table 15 is a one, the logical address is re-mapped to a different physical address so that a replacement page is accessed.

When a one is encountered when reading re-map table 15, a separate address re-map table (not shown) is consulted to find the physical address. This address re-map table is typically stored in the last block of each flash device. Unfortunately, this scheme requires that the last block of the flash device is defect-free and not wear out; otherwise the address re-map table can re-map to the wrong page.

More complex re-mapping or address translation tables have been used with flash memory devices. Assar et al. in U.S. Pat. Nos. 5,479,638, and 5,485,595, assigned to Cirrus Logic of Fremont, Calif., teaches a content-addressable memory for a re-map table, using CAM, EEPROM, DRAM, or SRAM cells. This table includes an erase counter field which is incremented as a page is erased and written. Once a page reaches a threshold erase count, it is moved to an unused page. Once all unused pages are depleted, a clean-out erase cycle is performed to clear all erase counters to zero. The process then repeats. Thus the wear on pages of flash memory is spread out or leveled among all pages.

Periodically clearing the erase counters is undesirable because there is no way to determine the total number of erase/write cycles to a given block of flash memory. Some blocks can be use heavily while others are lightly used; yet their erase counters are periodically cleared to zero regardless of the usage. Thus while wear-leveling occurs between erase-counter clears, longer-term wear leveling beyond the erase-counter clears is not performed.

Not periodically clearing the erase counters allows the total number of erase/writes to be stored, but then pages can be swapped unnecessarily when their erase counts hover around the threshold. This thrashing of pages is similar to the problem seen in processor caches.

Other flash memory systems with wear-leveling are taught by Kaki et al. in U.S. Pat. No. 5,530,828, assigned to Hitachi of Tokyo, Japan, and Harari et al. in U.S. Pat. No. 5,602,987, assigned to SanDisk Corp. of Sunnyvale, Calif. Kaki et al. use a management table with a counter that counts bytes written as the 512 bytes are written to a page. Harari et al. uses a data cache to buffer writes to the flash memory and reduce the total number of writes to flash.

While these flash memory systems are useful, a more effective flash memory system is desired. A more efficient and exact wear-leveling scheme is desired. It is desired to minimize excess writes to flash memory while re-mapping addresses to pages of flash memory. A unified table for re-mapping, wear-leveling, and caching flash memories is desirable.

SUMMARY OF THE INVENTION

A unified re-mapping table for a flash-memory system has a plurality of entries. An entry is selected by a logical address from a host system.

Each entry in the plurality of entries has a physical-block-address field that contains a physical block address of a block in an array of flash-memory devices. Each flash-memory device contains non-volatile storage cells that retain data when a power supply is no longer applied to the flash-memory device.

A total-write-counter field indicates a total number of write-erase cycles of the block identified by the physical-block-address field. An incremental-write-counter field indicates an incremental number of write-erase cycles since a wear-leveling operation for the block. Both the total number and the incremental number from the entry must exceed thresholds to initiate wear-leveling for the block.

The block is wear-leveled by moving the physical block address and the total number to a different entry in the unified re-mapping table. Thus each entry includes the physical block address for address translation to the flash-memory devices and two write-counters for wear-leveling.

In further aspects of the invention a total-threshold register contains a total-write threshold for the flash-memory system. An incremental-threshold register contains an incremental-write threshold for the flash-memory system. A total compare means is coupled to the total-threshold register and receives the total number from the entry selected by a current logical address. The total compare means activates a first signal when the total number from the entry in the unified re-mapping table exceeds the total-write threshold.

An incremental compare means is coupled to the incremental-threshold register and receives the incremental number from the entry selected by the current logical address. It activates a second signal when the incremental number from the entry in the unified re-mapping table exceeds the incremental-write threshold.

A wear-leveler is activated by a write to the current logical address when both the first signal and the second signal are activated. It wear-levels the block by moving the physical block address and the total number to a different entry in the unified re-mapping table. It replaces the physical block address with a new physical block address for a physical block with a smaller total number of write-erase cycles. Thus the total number from the entry must exceed the total-write threshold and the incremental number must exceed the incremental-write threshold to initiate wear-leveling.

In still further aspects the total-write-counter field is never cleared but continues to increase over a lifetime of the flash-memory system. However, the incremental-write-counter field is reset when the block is allocated to a different logical address and moved to a different entry in the plurality of entries. Thus the total-write-counter field is never reset but the incremental-write-counter field is reset by wear-leveling.

In further aspects, each page in the flash-memory devices contains a data field and a system field. The system field contains only one byte for mapping, while all other bytes in the system field are available for an error-correction code for the data field. Thus all except one byte of the system field is used for the error-correction code.

In further aspects the one byte for mapping for each page in a block of pages is combined with the one byte for mapping for other pages in the block to form a block pointer. The block pointer contains a copy of the total number and the incremental number of writes from the entry in the unified re-mapping table for the block.

In other aspects the block pointer includes the logical address for data in the data field of pages in the block. Thus the block pointer includes a reverse map with the logical address mapped to the physical block address for the block.

In further aspects of the invention each entry in the plurality of entries has a cache valid field that indicates when data identified by the logical address resides in a cache. The cache has volatile memory that loses data when power is lost. A cache index field contains a cache index when the cache valid field indicates that the data resides in the cache. The cache index identifies a location in the cache of the data for the logical address. Thus each entry identifies the location in cache for the data or the location in the flash-memory devices.

In other aspects the cache contains only data while cache tags containing cache addresses are absent for the cache. Thus the cache index in the unified re-mapping table eliminates the cache tags.

DETAILED DESCRIPTION

The present invention relates to an improvement in flash-memory controllers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Dual Write Counters

The inventors have realized that more efficient yet flexible wear-leveling can be accomplished if both the total number of writes and the incremental number of writes to a block are stored. Dual write counters keep track of:

1. total number of writes to a block over its entire existence,
2. incremental number of writes since the block's last wear-leveling operation.

The total-write counter is never reset; the incremental-write counter is reset after each wear-leveling swap. Both the total and incremental-write counts are stored for every block. Each time a block is written, its total-write count is compared to a total-write threshold, while the block's incremental-write count is compared to an incremental-write threshold. Both the total and incremental thresholds must be exceeded for a wear-leveling swap to occur.

The incremental-write counter prevents thrashing, where a block is continually swapped back and forth during successive wear-leveling operations. The total-write counter allows the wear-leveling firmware to determine which blocks have had the most writes and are most likely to wear out. The total and incremental thresholds can be adjusted over the life of the flash-memory system, or tweaked to improve performance. Wear-leveling firmware can search for a replacement block that has both a low number of total writes and a low number of recent (incremental) writes.

Unified Re-Map Table Has Wear-Leveling Counters

The inventors have also realized that the dual write counters are preferably stored in a unified re-map table along with address translation information. All flash accesses are first routed through the unified re-map table to determine the physical block address of the data in flash memory. This one-step re-mapping is faster for bad pages than the prior-art technique of mechanical mapping followed by reading re-map pointers of bad pages.

Unified Re-Map Table Replaces Cache Tags

Frequently-written data may also be buffered in a cache. The frequent writes can be merged together in a copy-back cache before being written to the flash memory. Such write-buffering by an SRAM or DRAM cache can reduce the number of writes to flash memory, thus extending its life.

Rather than have a separate tag RAM for the cache, the cache tags are merged into the unified re-map table. Since the re-map table is accessed with the logical address, the tag portion of the address is not stored. Instead, the cache index is directly stored in the re-map table, along with the cache valid bits, dirty bits, etc.

A single lookup of the re-map table for a logical address produces the physical block address (PBA) of the data in flash memory, the write-counts for wear-leveling, and the cache index (pointer to the data in the cache) should the data currently be in the cache.

Arbitrary Re-Mapping

Figure 3:
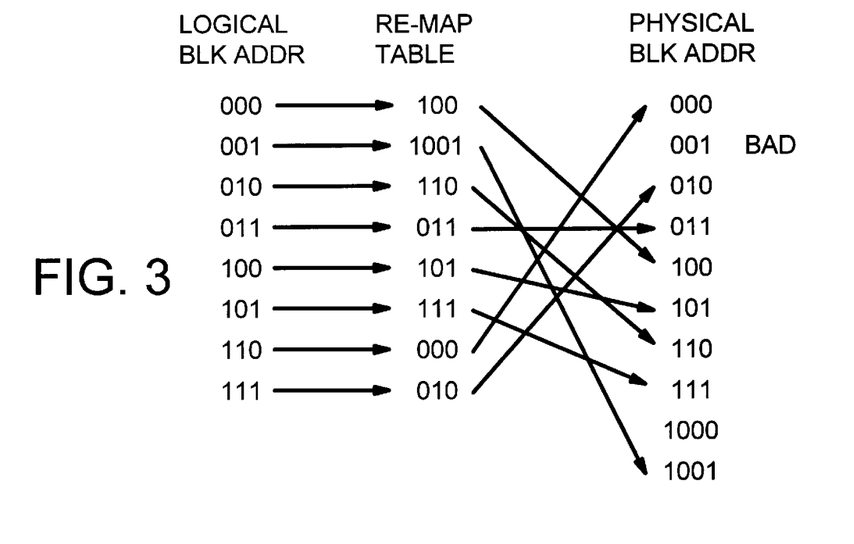
FIG. 3 is a diagram illustrating re-mapping of all accesses to a flash memory system.

FIG. 3 is a diagram illustrating re-mapping of all accesses to a flash memory system. Logical block addresses (LBA's) from a user or host system are received and used as an index into a re-map table. The re-map table includes a physical block address (PBA) for each possible logical block address. Since all accesses first pass through the re-map table, logical addresses can be arbitrarily translated into physical addresses for the flash devices. The physical addresses do not have to correspond to the logical addresses, allowing more-efficient wear-leveling to occur. Flash blocks can be swapped and frequently-written addresses allocated to different flash blocks over time without regard to the logical address. The access time is the same whether a block is re-mapped or not.

The physical address space is larger than the logical address space for the flash memory, as can be seen in FIG. 3. Additional blocks of flash memory are needed as flash blocks wear out and must be replaced. More flash memory is needed for system information such as storing non-volatile backups of the re-map table.

Rather than map flash pages, entire blocks are mapped. Since the block is the smallest unit for erase, while the page is the smallest unit for write, it is more efficient to keep block-based wear-leveling and re-mapping information. Thus blocks rather than pages are re-mapped by the unified re-map table. A block is typically composed of 16 pages. A page is usually 512 bytes in size.

FIG. 3 shows that logical block address (LBA) 000 is re-mapped to PBA 100, while LBA 001 is re-mapped to PBA 1001. Defective PBA 001 is not used, while good PBA 1000 is not used but is available as a replacement PBA should one of the other PBA's fail. In actual systems, the LBA's and PBA's have more address bits than shown in FIG. 3, such as 32 bits for the LBA and 32 bits for the PBA.

Figure 4:
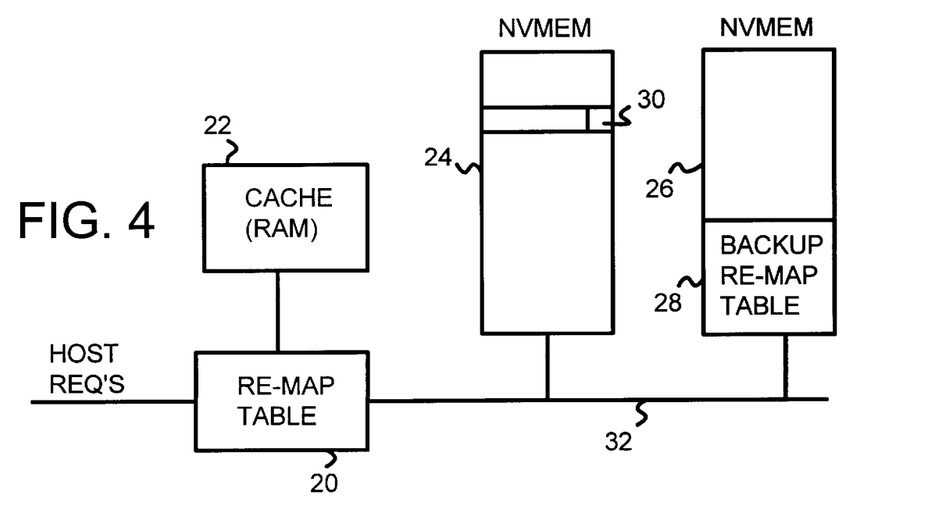
FIG. 4 is a diagram of a flash-memory system using a write-back cache.

Flash-Memory-System Block Diagram—FIG. 4

FIG. 4 is a diagram of a flash-memory system using a write-back cache. Such a system is useful as a mass-storage replacement to a hard disk on a personal computer and is sometimes referred to as a flash "disk", even though no rotating disk is used.

Host requests for access to flash storage are first re-mapped by unified re-map table 20. These host requests contain a logical address which includes a logical-block address (LBA) and an offset address that identifies a page within a flash block and perhaps a byte within a page for a read access. Some embodiments only read a page or a block at a time and thus do not use offset address bits.

Unified re-map table 20 contains entries preferably for all LBA's. The entry for the current LBA is read from unified re-map table 20, and a cache-valid bit is checked to determine if the LBA's data is in cache 22. More-recently accessed LBA's have their data stored in cache 22 so that writes to the same pages of flash memory can be merged together before updating the flash memory. Write-caching reduces the number of writes to flash memory and thus reduces wear and improves performance.

When the cache valid bit from the entry retrieved from unified re-map table 20 indicates that a copy of the data is stored in cache 22, then the data is either read from or written to cache 22. A cache-index field contained in the entry from unified re-map table 20 is used to locate the data in cache 22. Thus cache 22 does not have a tag RAM as most caches do.

When the cache valid bit indicates that the data is not stored in cache 22, then a PBA field in the entry retrieved from unified re-map table 20 is used to access the data in flash memory. Flash memory is contained in several non-volatile (NV) flash memories 24, 26, which can be individual flash-memory chips, or cards of flash-memory chips such as flash PC cards. Bus 32 is used to access flash memories 24, 26.

Since unified re-map table 20 is contained in volatile SRAM memory, back-up copy 28 of the re-map table is stored in flash memory 26. When power fails, unified re-map table 20 can be re-loaded from back-up copy 28. A second back-up copy may also be stored in flash memory 26. A third level of back-up protection is available by reconstructing unified re-map table 20 from block-pointer fields 30 at the end of each block in flash memories 24, 26.

Figure 5:
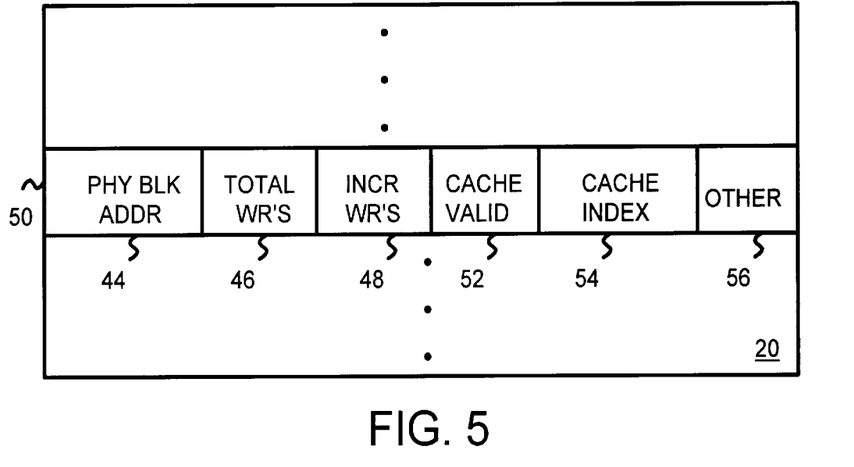
FIG. 5 is a diagram of an entry in the unified re-map table for a block of flash memory.

Unified Re-Map Table Entry—FIG. 5

FIG. 5 is a diagram of an entry in the unified re-map table for a block of flash memory. The entry includes address translations, a cache valid bit, and dual write counters for total and incremental writes to this block. Unified re-map table 20 contains a plurality of entries 50, each for a different logical block address (LBA). The LBA or a portion of the LBA is used as an index into unified re-map table 20 to select one of the entries 50.

Entry 50 contains physical block address PBA field 44, which contains the physical address of the flash memory device containing the data of the LBA. This physical address includes a portion of the address that identifies a flash memory chip or card, and another portion that identifies a block within a flash chip.

Wear-leveling information is contained in dual write-counter fields 46, 48 in entry 50 for each physical flash block. As physical blocks and thus PBA field 44 are swapped for wear-leveling, the values in counter fields 46, 48 are also moved to other entries with the contents of PBA field 44. Total-write-counter field 46 contains a value representing a total number of writes to the physical block since system manufacture. Incremental-write-counter field 48 contains the number of writes since this PBA was allocated to the LBA, or since it was last wear-leveled. Incremental-write-counter field 48 is preferably cleared when physical flash blocks are re-assigned to a LBA, but the total-write count from total-write-counter field 46 is transferred over from the old entry to the entry for the newly allocated LBA.

Cache valid field 52 contains a valid bit that is set when the LBA's data resides in a cache. Cache index field 54 then contains an index or pointer to the data in the cache. Cache valid field 52 may also contain a dirty bit to indicate when the data in the cache has been modified but not yet copied back to the flash memory. Other cache management information can be contained in cache valid field 52, or in other field 56.

Figure 6:
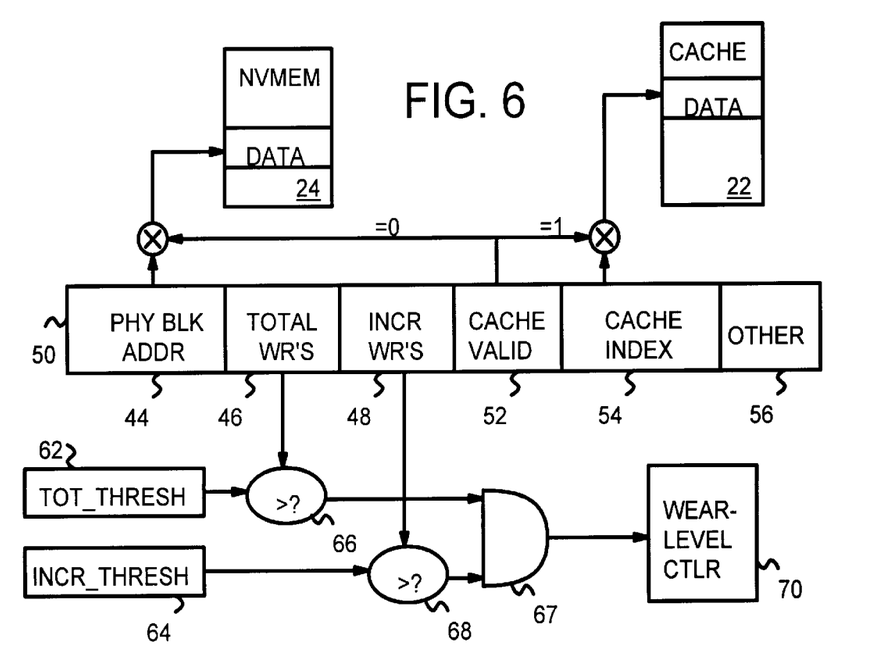
FIG. 6 shows how the entry in the unified re-map table is used to access data in the cache or in flash memory, and how the wear-leveling counters are used to determine when wear-leveling is needed.

Use of Unified Wear-Leveling, Cache & Flash Entry—FIG. 6

FIG. 6 shows how the entry in the unified re-map table is used to access data in the cache or in flash memory, and how the wear-leveling counters are used to determine when wear-leveling is needed. An entry 50 from the unified re-map table is selected by a logical block address (LBA).

Cache valid field 52 is used to determine when data in cache 22 is valid for the entry's LBA. When cache valid field 52 indicates that the cache is valid, cache index field 54 is used to find the data in cache 22. Otherwise, the physical block address from PBA field 44 is used to access the data in flash memory 24.

To determine when wear-leveling is required, the total writes for this physical block in flash memory 24 is read from total-write-counter field 46 and compared by comparator 66 to the total-write threshold programmed into register 62. In a similar manner, the incremental writes since the block's allocation or last wear-leveling is read from incremental-write-counter field 48 and compared by comparator 68 to the incremental threshold programmed into register 64. The threshold values in registers 62, 64 are system-wide thresholds while the write counts in fields 46, 48 are counter values for the physical flash block currently being accessed. The threshold values in register 62, 64 are changed over the life of the system as the level of wear on the flash memories increases.

When both thresholds in register 62, 64 are exceeded by the counter fields 46, 48, AND gate 67 activates wear-level controller 70. This AND gate can be implemented by firmware rather than by hardware. Wear-level controller 70 then performs a wear-leveling operation to swap the logical address to a different, less-used physical flash block by swapping fields 44, 46, 48 with another physical block. Note that the cache fields 52, 54 are not swapped since entry 50 is for a particular logical address, and cache 22 is addressed (via the re-map table) by the logical addresses.

Once a replacement block is found, both the heavily-written block and the less-used replacement block are copied to the cache. Both blocks are marked in the cache as dirty. Then the PBA's for the blocks are swapped in the re-map table and the data from the cache is written back to the new physical blocks.

Example of Wear-Leveling with Dual Write Counters—FIG. 7

Figure 7A:
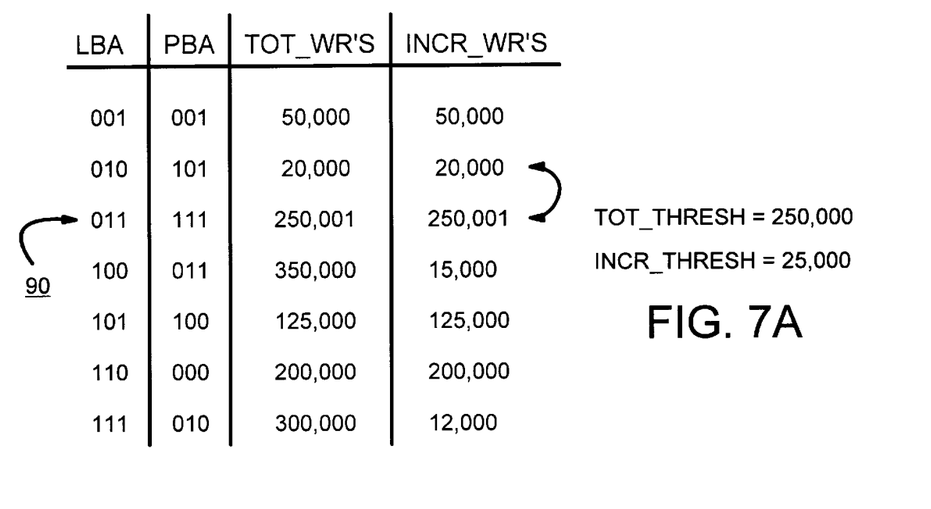
FIGS. 7A–7E show examples of wear-leveling operations using dual write counters for total and incremental writes to flash blocks.

FIGS. 7A–7E show examples of wear-leveling operations using dual write counters for total and incremental writes to flash blocks. In FIG. 7A, the system-wide total threshold is set to 250,000 writes, while the system's incremental-write threshold is set to 25,000 writes. The table shows 7 entries (rows) in the unified re-map table for 7 sequential logical block addresses (LBA's). These 7 LBA's are mapped to various physical blocks in flash memory by the PBA fields.

Each entry (row) has a total-write count and an incremental-write count. It is expected that flash blocks begin to wear out after 500,000 to 1,000,000 writes, when the total-write count of a block exceeds 500,000 or 1,000,000. The total-writes threshold is set initially to about half or one-quarter of the expected life of a flash block, while the incremental-write threshold is set to about 10% of the total-write threshold.

The last entry, for LBA=111, has 300,000 total writes, but only 12,000 incremental writes since PBA 010 was allocated to LBA 111, perhaps by a wear-leveling swap operation. Although the total writes of 300,000 exceeds the total threshold, the incremental writes of 12,000 is below the incremental threshold of 25,000. Thus PBA 010 is not yet ready for wear-leveling.

The sixth entry, for LBA 110, has 200,000 total and incremental writes. It is also not a candidate for wear-leveling, since the total writes has not yet exceeded the total threshold of 250,000. Other pages are also not ready for wear-leveling, having few total writes (LBA's 001, 010, 101, 110) or not enough incremental writes (LBA's 010, 100, 111).

Entry 90, for LBA 011, is ready for wear-leveling, since its total writes has exceeded the total threshold of 250,000, and its incremental writes has also exceeded the incremental threshold of 25,000. The wear-leveling controller searches for a least-used flash block. The physical block with the least total number of writes is PBA 101, with 20,000 total writes. This block is currently allocated to LBA 010. The wear-leveling swap thus moves the data for the heavily-used LBA 011 to the lightly-used PBA 101, while the existing data in PBA 101 for LBA 010 is transferred to the cache and then to the heavily-written PBA 111.

Figure 7B:
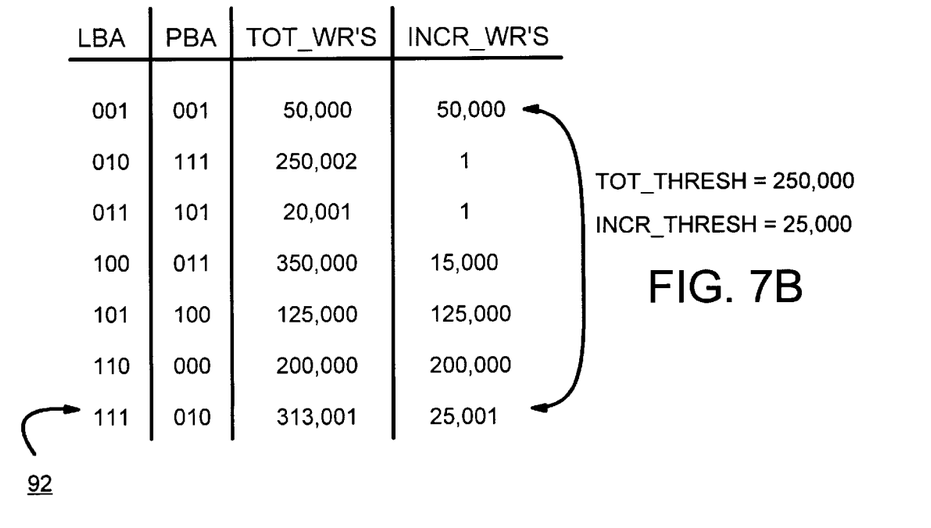

FIG. 7B shows that after the wear-leveling swap of LBA's 010 and 011, the incremental-write counters for these two PBA's are reset to one. The PBA and total-write count fields are swapped for LBA's 010 and 011 since the data has also been swapped by the wear-leveling operation.

Figure 7C:
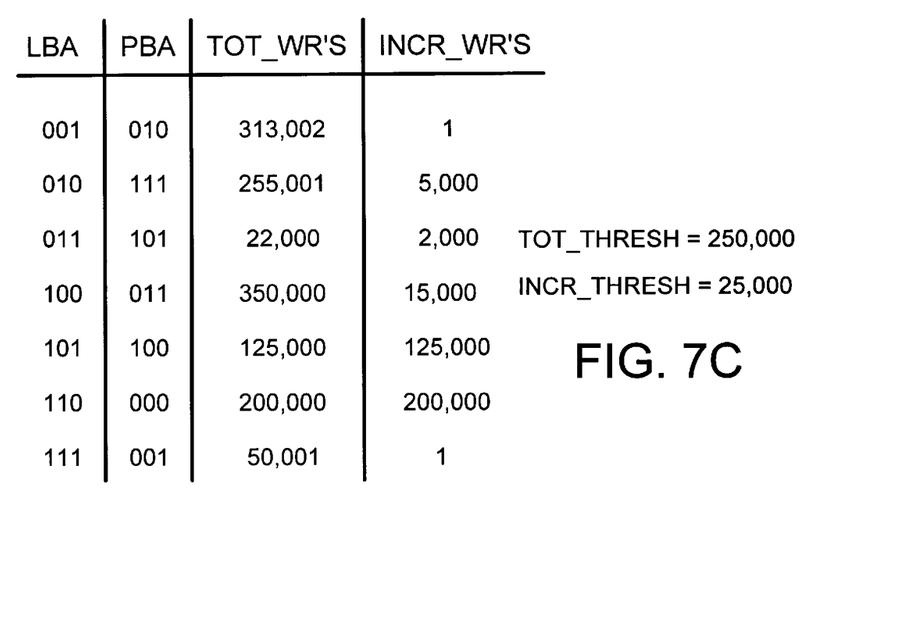

Additional requests from the host are directed to LBA 111, which now exceeds the system's incremental threshold of 25,000 incremental writes. LBA 111 is mapped by entry 92. Since the total writes for PBA 010, assigned to LBA 111, exceeds the total-write threshold of 250,000, wear-leveling is required for this block. The least-used block is LBA 011 with 20,000 writes, but this block was just recently swapped and thus has a very low incremental-write count. The wear-leveling firmware instead chooses the next-least-used block, PBA 001 with only 50,000 writes. This block is allocated to LBA 001, and thus LBA 001 and LBA 111 are swapped. FIG. 7C shows the results, with PBA's 001 and 010 being swapped among LBA's 001, 111. The total-write counts for each PBA are swapped but not cleared, while both incremental-write counts are reset to indicate the initial write.

In FIG. 7C, 4,999 and 1,999 additional writes have occurred to LBA's 010, 011, respectively. Although PBA 111 LBA 010 has now received 255,001 total writes, only 4,999 of these writes have occurred since the block was wear-leveled. While the total threshold has been exceeded, the incremental threshold has not and thus wear-leveling is delayed. Finally, in FIG. 7D, additional writes to this block have increased the incremental-write count beyond the incremental threshold of 25,000.

Figure 7D:
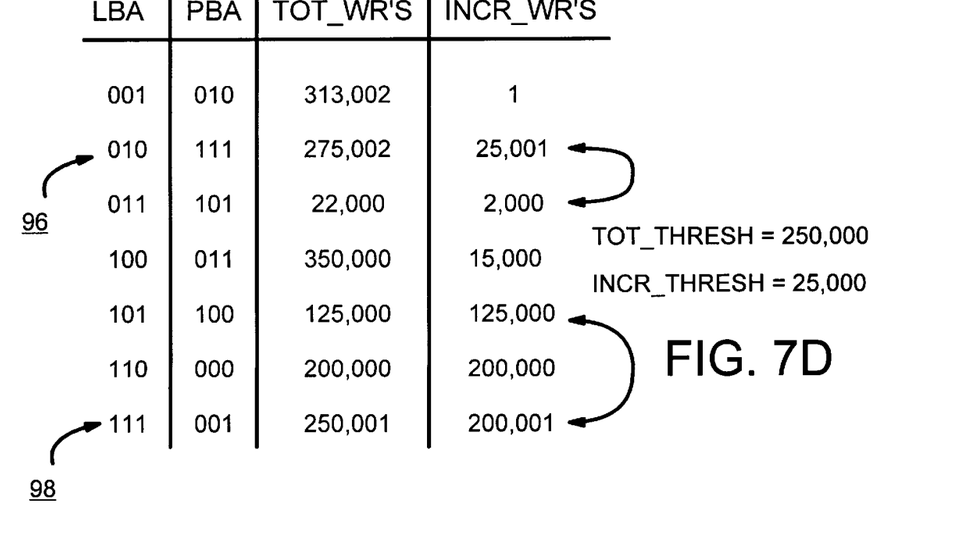

Entry 96 is ready for wear-leveling, since both the total and incremental thresholds are now exceeded. The least-written flash block is PBA 101 with 22,000 total writes. LBA's 010 and 011 are again swapped, as are their PBA and total-write-count fields, while their incremental-write counts are cleared.

Additional writes for entry 98 (mapped to PBA 001) have caused the total threshold to be reached, while the incremental threshold is also exceeded. The next least-used block is PBA 100, and LBA's 111 and 101 are swapped.

As additional writes occur, most blocks reach or exceed the total threshold or 250,000 writes. Leaving the total threshold constant when most blocks have exceeded the threshold would cause wear-leveling to occur each time the incremental threshold is reached. This would increase overhead as too many wear-leveling operations would occur. To maintain efficiency, the total-write threshold is increased from 250,000 to 300,000 writes as the average total writes per block reaches the total threshold of 250,000.

Figure 7E:
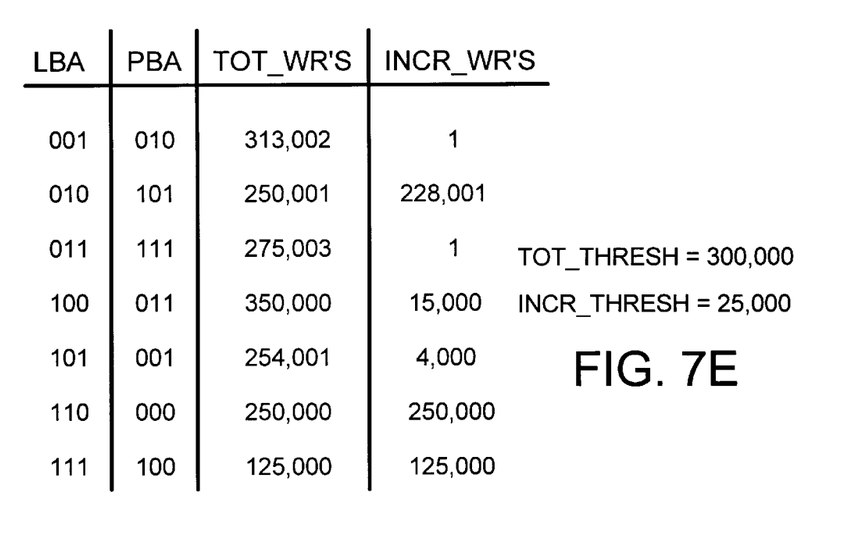

FIG. 7E shows the total-write threshold increased to 300,000. The second entry, containing PBA 101 that was swapped in FIG. 7D, has been receiving many writes. Since the total threshold was increased to 300,000, no swapping occurs even though the incremental-write threshold is exceeded. This allows less-used PBA 101 to catch up to more heavily-used blocks.

Likewise, LBA's 101, 110, 111 have all reached or exceeded the old total threshold of 250,000, but have not yet reached the new total threshold of 300,000. Reads of flash memory do not wear out the devices, so only writes are tracked. Often, many more reads than writes occur. The processes shown in FIGS. 7A–7E take place over many years. Other physical blocks beyond those shown in FIGS. 7A–7E that are not allocated to an LBA are also present in the system. These other physical blocks are also available as replacement blocks for wear-leveling.

Adjustment of Thresholds Over Life of System

The total-write threshold for the system is initially set to about half of the expected lifetime of the flash memory. As the average number of writes per block increases, the total-write threshold is increased to halfway between the average number of writes and the expected lifetime. The threshold can be adjusted in relatively large increments. As the average number of writes increases, the total-write threshold increases until it is close to the expected maximum lifetime writes. It is possible that the flash devices last beyond the expected lifetime, so the threshold can continue to increase beyond the expected lifetime.

The incremental threshold is initially set to a fraction of the total-write threshold, perhaps ⅛ to 1/16 of the total threshold. The incremental threshold can be made smaller as the total threshold increases so that more wear leveling occurs as the devices age. In the early years of the system little wear leveling occurs, improving initial performance. This is an advantage over single-counter systems.

Figure 8:
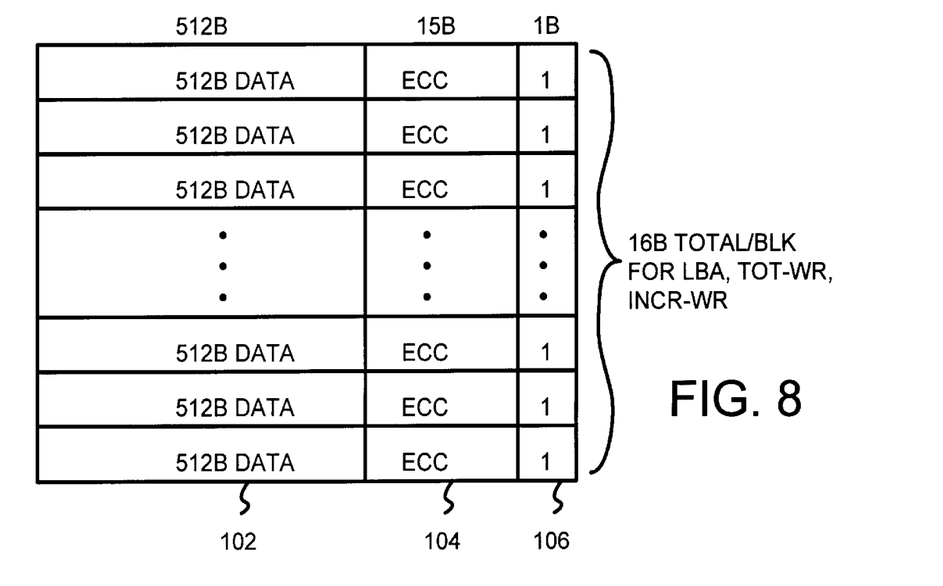
FIG. 8 shows that block-granularity rather than page-granularity for re-mapping and wear-leveling provides additional bits for the error-correction code.

Block-Granularity for Re-Mapping—FIG. 8

FIG. 8 shows that block-granularity rather than page-granularity for re-mapping and wear-leveling provides additional bits for an error-correction code. Some failures of the flash memory can be tolerated when an error correction scheme such as Hamming bits or Reed-Solomon block code are used. Error correction allows simple errors of one or a few bytes to be corrected, and longer multi-byte errors to be detected. Error correction is especially useful in flash memory systems since the storage cells wear out after repeated use.

When individual pages are mapped and replaced for defects, most of the 16-byte pointer field is needed for storing the pointer to the replacement page, and for other system-overhead functions. Fewer bytes are available for error correction, so a weaker error-correcting code must be used.

Conventional wisdom is that the granularity for defect re-mapping be kept as small as possible. Instead, the inventors have realized that more efficient wear-leveling can overcome the drawbacks of disabling an entire block rather than just a page when a bad flash page is detected. The benefits of using a unified re-mapping and wear-leveling table overcome the disadvantages of the larger granularity of block re-mapping. As flash-memory sizes increase, the relative loss from block rather than page re-mapping decreases.

A flash block generally has 16 pages, each with a 512-byte data field 102 and a 16-byte pointer field. Only one of the 16 bytes of each page's pointer field are used for mapping information, allowing the other 15 bytes to be used for error-correction code (ECC) information for the page. Thus the 16-byte pointer field includes 15-byte ECC field 104 and 1-byte mapping field 106.

While each ECC field 104 is for a particular page, all 16 mapping fields 106 for all 16 pages are combined together to form a single 16-byte record for the entire block. This record contains the LBA that the block is allocated to, the total-write count, and the incremental-write count for this physical block. This record only needs to be updated during wear-leveling operations when the mapping changes, and periodically as the number of writes to the block increases. For example, the system firmware can update the total and incremental-write counts only after every 1,000 writes. Alternately, the write counts can be updated after each write to the block, when only block writing and not page writing is allowed.

The single 16-byte record for the block, constructed from the 1-byte mapping fields 16, contains the logical address for the block rather than a pointer to a physical block as in the prior art of FIG. 1. Thus a reverse-map rather than a forward map is contained in mapping fields 106. This reverse map can be used to re-construct the mapping table when necessary, although it is not useful for mapping logical addresses to physical addresses, since the physical address (PBA) must be known first to obtain the logical address (LBA).

Figure 9:
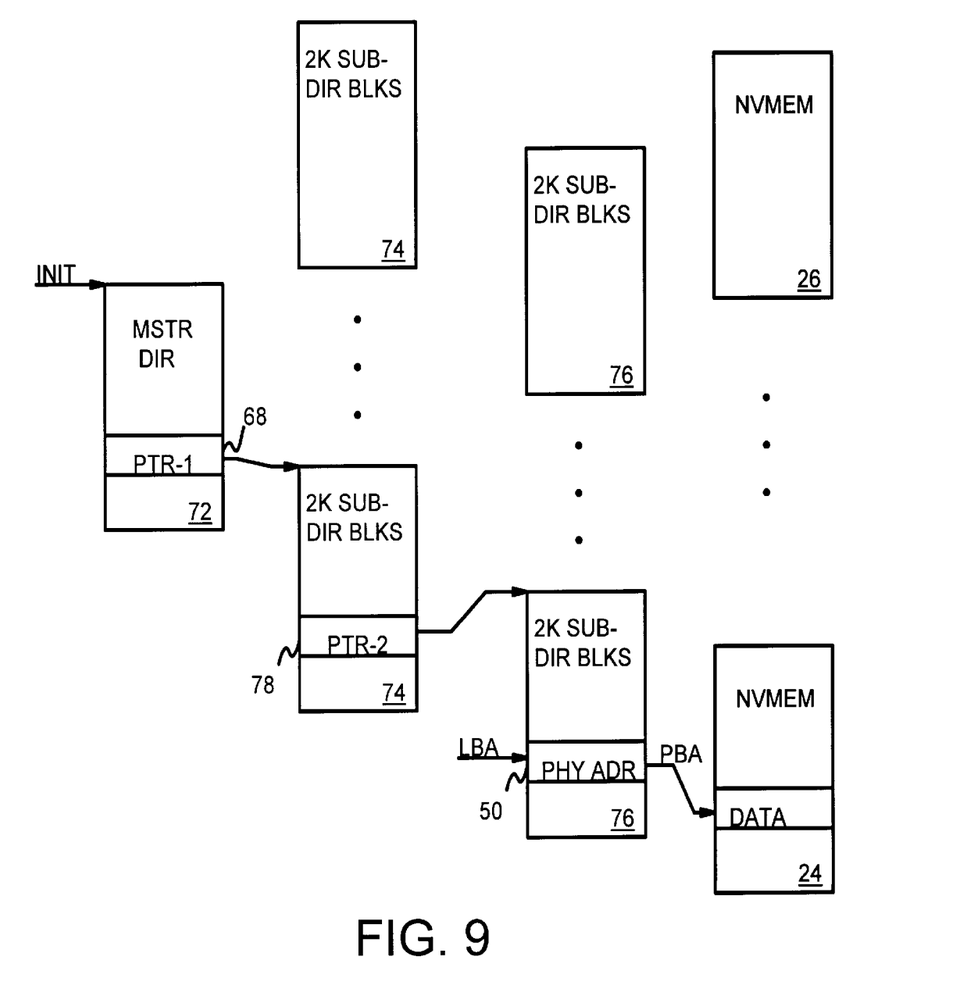
FIG. 9 shows a multi-level unified re-mapping table.

Multi-Level Mapping Table—FIG. 9

FIG. 9 shows a multi-level unified re-mapping table. Rather than have a single large table with many entries, one or two directory tables can first be consulted to find a pointer to the actual entry. This allows the different parts of the unified re-map table to be re-located as flash blocks wear out. Only the first-level directory table needs to be in a known location.

On system initialization, several pre-determined locations are checked to find a first-level directory table 72. A first pointer 68 from directory table 72 is used to locate each of several second-level tables 74. A second pointer PTR-2 78 in table 74 points to the location of one of many unified re-mapping tables 76. A logical block address LBA is used to select an entry 50 in table 76. Entry 50 contains the PBA, dual write counters, and cache fields shown in FIGS. 5, 6. The PBA from entry 50 is then used to locate the data block in flash memory 24. Once tables 76 are loaded into RAM, they are directly accessed with an LBA index.

Assuming 8 KB flash blocks, first-level directory table 72 contains 2K pointers to 2K second-level tables 74. Each of the second-level tables 74 has 2K pointers to entries in unified re-mapping tables 76. Thus a total of 4M blocks of entries 50 can be mapped. When each entry 50 requires 16 bytes of storage, the total logical address space is 16 Tera-bytes.

During power-up, the re-map table in RAM is read from a back-up copy in flash memory. The first-level directory table is stored at a known location in the flash memory. The initialization routine checks this location first. If the location has faulty flash memory cells, then a generated checksum does not match a checksum stored with the flash block. The initialization routine then reads the sequentially following blocks to search for a good copy of the directory table. If a good copy of the table is not found in the 7 following blocks, then a second known location and its next 7 sequential blocks are checked. If a good copy of the table is still not found, then the entire re-map table is re-constructed from the LBA's in the reverse pointers in each 16-byte block-pointer field for each block.

Interleaving of Flash Blocks or Pages

Interleaving can be combined with the invention. Interleaving is desirable since multiple accesses can occur in parallel to the flash devices, improving performance. Interleaving is accomplished by altering the physical address bits assigned to decoders for the flash devices and the physical address bits assigned to decode blocks and pages within a flash device.

A non-interleaved assignment of physical address bits is:

3:0 Page within a block

15:4 Block within a flash device

31:16 Device within a bank; bank within the system, etc.

Interleaving of blocks across four devices has the bit assignment:

3:0 Page within a block

5:4 Interleave among four devices

17:6 Block within a flash device

31:18 Device within a bank; bank within the system, etc.

With such block interleaving, a sequence of four blocks are interleaved among four flash devices. Performance is improved when sequential blocks are accessed and the flash devices are slow.

Another type of interleaving interleaves smaller pages rather than larger blocks among multiple devices:

0:1 Interleave among four devices

5:2 Page within a block

17:6 Block within a flash device

31:18 Device within a bank; bank within the system, etc.

Since pages are smaller than blocks, addresses are more likely to be interleaved with the page-interleaving scheme. However, wear-leveling and re-mapping can no longer occur for each block, since one block cannot be moved away from the other three blocks in the interleave group. Instead, re-mapping is performed for an interleave of four blocks. Each entry in the unified re-map table then corresponds to an interleave of four blocks, rather than just one block. This has the additional advantage of reducing the size of the re-mapping table. Another advantage is when different flash-device capacities are used. Interleaving using the largest block-size can make all devices appear the same.

Interleaving can also be applied to the re-map table and any spare blocks. Different portions of the re-map table are spread out among the interleaves, allowing these portions to be read or written in parallel. Likewise, spare pages are spread out among the interleaves rather than just located at the end of the address space.

The interleaving used can be flexible by multiplexing different logical address bits to the unified re-map table. The LBA is the address bits above the page within a block bits, and includes the interleave bits for block interleaving, but does not include the interleave bits for page interleaving. Bits 31:4 are routed to the re-map table for block interleaving, but bits 31:6 are sent to the table for page interleaving. Bits 4 and 5 are routed to select the entry in the unified re-map for block interleaving but not for page interleaving. Different intended applications or uses for the flash-memory system can be configured for page or block interleaving, or no interleaving, by the manufacturer.

ADVANTAGES OF THE INVENTION

A more effective flash memory system is disclosed. A more efficient and exact wear-leveling scheme minimizes excess writes to flash memory while re-mapping addresses to pages of flash memory. Wear-leveling is more even since the dual write-counters are compared to separate total and incremental thresholds. These thresholds can be separately optimized. Further experience and research into wear-leveling can discover improvements that can be incorporated into the system by adjusting the thresholds with a firmware update.

The incremental-write counter prevents thrashing, where a block is continually swapped back and forth during successive wear-leveling operations. Using the invention, the same block is not moved again until the incremental threshold of writes has occurred. The total-write counter allows the wear-leveling firmware to determine which blocks have had the most writes and are most likely to wear out.

The total and incremental thresholds can be adjusted over the life of the flash-memory system, or tweaked to improve performance. The total threshold can be increased to delay the start of wear-leveling, reducing system overhead at the cost of uneven wear in the early years of the system. The incremental threshold allows the deviation from the average wear to be tuned. A lower incremental threshold increases wear-leveling and keeps blocks closer to the average than does a higher incremental threshold.

The dual write counters are stored in a unified re-map table along with address translation information. All flash accesses are first routed through the unified re-map table to determine the physical block address of the data in flash memory.

A single lookup of the re-map table for a logical address produces the physical block address (PBA) of the data in flash memory, the two write-counter values for wear-leveling, and the cache index (pointer to the data in the cache) should the data currently be in the cache. The unified table is thus for three functions: re-mapping, wear-leveling, and caching.

Rather than have a separate tag RAM for the cache, the cache tags are merged into the unified re-map table. Eliminating the tag RAM reduces the cost of the cache. Data can be fetched from the cache more quickly because the cache valid bits are immediately available as the re-map table is read, rather than having to wait for a separate cache tag RAM to be accessed after the re-map table is read. The cache allows wear-leveling operations to be performed as background tasks, giving host requests higher priority. This improves the latency of host requests.

The 16-byte system-overhead field for each flash page stored a physical address pointer to another flash page in prior-art systems. The invention stores a reverse pointer—a logical address rather than a physical address. This LBA is stored in the 16-byte block-pointer field for a block of 16 pages—only one byte per page is used, leaving more bytes for error correction. The additional bytes for error correction allow more errors to be corrected, improving performance and extending device lifetime.

The reverse pointers can be read from flash memory and used by firmware to re-build the unified re-map table when power is restored. The reverse pointers provide a back-up mechanism should the re-map table be stored to a faulty flash block. The reverse pointers can also be used to check the stored re-map table for errors.

Using a multi-level re-map table has several advantages. The first level, or directory, is located in several pre-determined locations. When one copy of the directory at one of the predetermined locations becomes defective, another of the pre-determined locations is read. The directory table is only written when one of the second-level tables is moved; since tables are infrequently moved, few writes occur to the directory and thus wear is minimal. The multiple levels of tables allows the re-map table to be spread out among many physical devices in the system.

ALTERNATE EMBODIMENTS

Several other embodiments are contemplated by the inventors. The comparison of the thresholds to the counter values can signal for wear-leveling when one value equals the other, which is approximately when one exceeds the other. The exact comparison point and method is not critical to the invention as wear leveling is effective when approximate rather than exact.

The granularity of mapping can be increased to include several blocks that are interleaved together. The number of entries in the unified table can be reduced when several flash devices are interleaved together.

A cache of the re-map table can be used rather than a full table when the access times for various blocks can vary. Rather than storing all entries for all flash blocks in RAM, only the most-recently-used entries can be stored. A fully-associative unified table in RAM is used, similar to a translation-lookaside buffer (TLB) for address translation. LBA's that do not have recently-used entries in the RAM table can be generated by reading tables 72, 74, 76 of FIG. 9 stored in a system area of the flash memory.

More sophisticated mapping and wear-leveling schemes may be added to the system. Since the logical addresses are all re-mapped through the unified re-mapping table, performance can be optimized by re-arranging where blocks are located on the physical flash devices. For example, some flash devices may be faster than other devices, either due to the type of flash chips used, or by their connection. Frequently-accessed addresses may be allocated to faster flash blocks during wear-leveling rather than to the absolute least-used block. Some frequently-used addresses can be allocated to interleaved flash devices to improve performance.

The cache index field in the unified table may contain a pointer to an additional cache structure containing valid bits and more complex cache management information, rather than pointing directly to the data in the cache. Rather than have a separate cache-valid bit, the cache index field can be set to zeros or some other number to encode that the data is not in the cache.

While the term "NVRAM" is widely used, it is somewhat of a misnomer since flash memory is not truly random-access. While reads can be to random pages, writes require that larger blocks be erased.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A unified re-mapping table for a flash-memory system, the unified re-mapping table comprising:
    a plurality of entries, an entry in the plurality of entries selected by a logical address from a host system, each entry in the plurality of entries having:
        a physical-block-address field containing a physical block address of a block in an array of flash-memory devices, each flash-memory device containing non-volatile storage cells that retain data when a power supply is no longer applied to the flash-memory device;
        a total-write-counter field for indicating a total number of write-erase cycles of the block identified by the physical-block-address field;
        an incremental-write-counter field for indicating an incremental number of write-erase cycles since a wear-leveling operation for the block;
    wherein both the total number and the incremental number from the entry must exceed thresholds to initiate wear-leveling for the block;
    wherein the block is wear-leveled by moving the physical block address and the total number to a different entry in the unified re-mapping table when data is exchanged between blocks,
    wherein the flash-memory system further comprises:
    a total-threshold resister containing a total-write threshold for the flash-memory system;
    an incremental-threshold register containing an incremental-write threshold for the flash-memory system;
    total compare means, coupled to the total-threshold register and receiving the total number from the entry selected by a current logical address, for activating a first signal when the total number from the entry in the unified re-mapping table exceeds the total-write threshold;
    incremental compare means, coupled to the incremental-threshold register and receiving the incremental number from the entry selected by the current logical address, for activating a second signal when the incremental number from the entry in the unified re-mapping table exceeds the incremental-write threshold;
    wear-leveling means, activated by a write to the current logical address when both the first signal and the second signal are activated, for wear-leveling the block by moving the physical block address and the total number to a different entry in the unified re-mapping table, and for replacing the physical block address with a new physical block address for a physical block having a smaller total number of write-erase cycles,
    whereby the total number from the entry must exceed the total-write threshold and the incremental number must exceed the incremental-write threshold to initiate wear-leveling and whereby each entry includes the physical block address for address translation to the flash-memory devices and two write-counters for wear-leveling.

2. The unified re-mapping table for a flash-memory system of claim 1 wherein the total-write-counter field is never cleared but continues to increase over a lifetime of the flash-memory system, but wherein the incremental-write-counter field is reset when the block is allocated to a different logical address and moved to a different entry in the plurality of entries, whereby the total-write-counter field is never reset but the incremental-write-counter field is reset by wear-leveling.

3. The unified re-mapping table for a flash-memory system of claim 2 wherein the block in the array of flash-memory devices is a smallest amount of memory capable of being erased, wherein writes to the block can occur only after an erase, the block comprising a plurality of pages, and each page comprising a plurality of bytes, whereby individual bytes cannot be erased unless an entire block of pages is erased.

4. The unified re-mapping table for a flash-memory system of claim 3 wherein each page in the flash-memory devices contains a data field and a system field, the system field containing only one byte for mapping, wherein all other bytes in the system field are available for an error-correction code for the data field, whereby all except one byte of the system field is used for the error-correction code.

5. The unified re-mapping table for a flash-memory system of claim 4 wherein the one byte for mapping for each page in a block of pages is combined with the one byte for mapping for other pages in the block to form a block pointer, the block pointer containing a copy of the total number and the incremental number of writes from the entry in the unified re-mapping table for the block, whereby the block pointer contains the total number and incremental number for all pages in the block.

6. The unified re-mapping table for a flash-memory system of claim 5 wherein the block pointer further includes the logical address for data in the data field of pages in the block, whereby the block pointer includes a reverse map with the logical address mapped to the physical block address for the block.

7. The unified re-mapping table for a flash-memory system of claim 1 wherein each entry in the plurality of entries further comprises:
   a cache valid field for indicating when data identified by the logical address resides in a cache, the cache comprising volatile memory that loses data when power is lost;
   a cache index field containing a cache index when the cache valid field indicates that the data resides in the cache, the cache index identifying a location in the cache of the data for the logical address, whereby each entry identifies the location in cache for the data or the location in the flash-memory devices.

8. The unified re-mapping table for a flash-memory system of claim 7 wherein the cache contains only data while cache tags containing cache addresses are absent for the cache, whereby the cache index in the unified re-mapping table eliminates the cache tags.

9. The unified re-mapping table for a flash-memory system of claim 1 wherein each entry contains a physical-block address for an interleave of at least four physical blocks, the at least four physical blocks being in at least four of the flash memory chips, whereby the unified re-mapping table stores entries for an interleave of physical blocks.

10. A flash-memory system comprising:
    a plurality of flash memory chips, each flash memory chip having non-volatile memory cells organized into pages and physical blocks, each physical block comprising a plurality of pages, the non-volatile memory cells retaining data when power is lost;
    a cache for storing a copy of some but not all data in the flash memory chips, the cache being a copy-back cache with more recent data than in the flash memory chips, the cache responsive to cache addresses;
    a mapping table, receiving logical addresses from a host, for translating the logical addresses to physical addresses or cache addresses, the mapping table having a plurality of entries for the logical addresses, each entry having:
        a physical-block address of a physical block in the flash memory chips;
        a total-write count of a total number of writes to the physical block address since manufacture of the flash-memory system;
        an incremental-write count of an incremental number of writes to the physical block since a last wear-leveling operation on the physical block;
        a cache valid bit for indicating when the data is in the cache or only in the flash memory chips;
        a cache index for generating a cache address for locating cache data in the cache, the cache data identified by the logical address;
    a wear-level indicator, coupled to the mapping table, for comparing the total-write count to a total threshold and for comparing the incremental-write count to an incremental threshold, for generating a wear-leveling signal when both the total threshold and the incremental threshold are met;
    a wear-leveler, coupled to begin a wear-leveling operation when the wear-leveling signal is received, for replacing the physical block address for the entry with a less-written physical block address having a lower total-write count;
    reset means, responsive to the wear-leveling signal, for resetting the incremental-write count when a block is wear-leveled;
    average write calculator, for calculating an average number of writes per physical block in the flash memory chips;
    average comparator, for comparing the average number of writes per block to the total threshold;
    threshold adjust means, coupled to the average comparator, for increasing the total threshold when the average number of writes exceeds the total threshold, whereby wear-leveling begins when both the total threshold and the incremental threshold are met by write counts stored in the entry in the mapping table and the total threshold is increased as the average number of writes per block increases and the incremental-write count is reset but the total-write count is not reset by wear-leveling.

11. The flash-memory system of claim 10 further comprising:
    access means, responsive to the cache valid bit, for sending the cache address generated from the cache index to the cache when the cache valid bit indicates that the data is in the cache, but otherwise sending the physical block address to the flash memory chips, whereby an address to the cache or to the flash memory chips is generated from the entry in the mapping table.

12. The flash-memory system of claim 10 wherein the incremental threshold is decreased as the total threshold is increased over a lifetime of the flash-memory system.

13. The flash-memory system of claim 12 wherein the total threshold is set to an initial value of at least half an expected number of writes in a lifetime of the flash-memory system during manufacture, whereby wear-leveling is not signaled until a block has half of its expected writes.

14. The flash-memory system of claim 12 wherein the total threshold is set to an initial value of at least 500,000 writes during manufacture, whereby wear-leveling is not signaled until a block has 500,000 writes.

15. The flash-memory system of claim 10 wherein each entry in the mapping table contains a physical-block address for an interleave of at least four physical blocks, the at least four physical blocks being in at least four of the flash memory chips, whereby the mapping table stores entries for an interleave of physical blocks.

16. The flash-memory system of claim 15 wherein the wear-leveler moves physical blocks of an interleave.

17. The flash-memory system of claim 16 wherein the mapping table receives logical addresses from the host that include interleave bits, the interleave bits for selecting one of the at least four of the flash memory chips in an interleave, the interleave bits not for selecting an entry in the mapping table.

18. The flash-memory system of claim 17 wherein the interleave bits are page-interleaving bits.

19. The flash-memory system of claim 17 wherein the interleave bits are block-interleaving bits.

\* \* \* \* \*